(12) United States Patent
Nishimura et al.

(10) Patent No.: US 8,376,633 B2
(45) Date of Patent: Feb. 19, 2013

(54) OPTICAL PATH CHANGER COMPONENT, OPTICAL CONNECTOR AND OPTICAL DEVICE

(75) Inventors: Akito Nishimura, Yotsukaido (JP); Kunihiko Fujiwara, Nagareyama (JP)

(73) Assignee: Fujikara Ltd., Tokyo (JP)

( * ) Notice: Subject to any disclaimer, the term of this patent is extended or adjusted under 35 U.S.C. 154(b) by 113 days.

(21) Appl. No.: 12/602,022

(22) PCT Filed: May 31, 2007

(86) PCT No.: PCT/JP2007/061093
§ 371 (c)(1), (2), (4) Date: Nov. 25, 2009

(87) PCT Pub. No.: WO2008/146385
PCT Pub. Date: Dec. 4, 2008

(65) Prior Publication Data
US 2010/0178006 A1    Jul. 15, 2010

(51) Int. Cl.
*G02B 6/36* (2006.01)
*G02B 6/42* (2006.01)

(52) U.S. Cl. .......... 385/88; 385/32; 385/83; 385/92

(58) Field of Classification Search .......... 385/32
See application file for complete search history.

(56) References Cited

U.S. PATENT DOCUMENTS

| | | | | |
|---|---|---|---|---|
| 6,116,791 A | * | 9/2000 | Laninga et al. | 385/83 |
| 6,160,937 A | * | 12/2000 | Fukuyama et al. | 385/52 |
| 6,402,389 B1 | * | 6/2002 | Steijer et al. | 385/65 |
| 7,187,839 B2 | * | 3/2007 | Tourne | 385/136 |
| 7,527,435 B2 | * | 5/2009 | Dean et al. | 385/78 |
| 2005/0220437 A1 | * | 10/2005 | Kim et al. | 385/137 |
| 2006/0161055 A1 | * | 7/2006 | Pewzner et al. | 600/310 |
| 2007/0292081 A1 | * | 12/2007 | Hashimoto et al. | 385/52 |
| 2009/0052836 A1 | * | 2/2009 | Hodge | 385/14 |
| 2010/0158446 A1 | * | 6/2010 | Ohta | 385/58 |

FOREIGN PATENT DOCUMENTS

| | | |
|---|---|---|
| JP | 02-015204 A | 1/1990 |
| JP | 11-202150 A | 7/1999 |
| JP | 2000-162479 A | 6/2000 |
| JP | 2000-509839 A | 8/2000 |
| JP | 2000-292658 A | 10/2000 |
| JP | 2002-139642 A | 5/2002 |
| JP | 2002-182069 A | 6/2002 |
| JP | 2003-043304 A | 2/2003 |
| JP | 2003-315578 A | 11/2003 |
| JP | 2004-094070 A | 3/2004 |
| JP | 2004-333590 A | 11/2004 |
| JP | 2005-106984 A | 4/2005 |

OTHER PUBLICATIONS

Communication, dated Apr. 18, 2011, issued by the Japanese Patent Office in corresponding Japanese Application No. 2005-349423.
Communication, dated Jan. 5, 2011, issued by the Japanese Patent Office in corresponding Japanese Application No. 2005-349423.
Partial English Translation of Japanese Office Actions issued by the Japanese Patent Office in corresponding Japanese Application No. 2005-349423 on Jan. 5, 2011 and Apr. 18, 2011.

* cited by examiner

*Primary Examiner* — Michelle R Connelly
(74) *Attorney, Agent, or Firm* — Sughrue Mion, PLLC (57) ABSTRACT

An optical connector is comprised of a main body and a wall formed in the main body and having a wall face which has guiding slots curving at an angle of about 90 degrees or one or more optical fiber holes. Optical fibers inserted into the main body along the lateral direction are made curved by the guiding slots or the optical fiber holes toward photoelectric devices disposed on an upper or lower face thereof.

11 Claims, 7 Drawing Sheets

OPTICAL PATH CHANGER COMPONENT, OPTICAL CONNECTOR AND OPTICAL DEVICE

TECHNICAL FIELD

The present invention relates to an optical path changer component and an optical device for changing optical paths of optical fibers at an angle of 90 degrees to link them with a photoelectric device or such.

BACKGROUND ART

In communication devices or data processing devices, to link optical paths for optical signals (such as optical fibers or optical waveguides) with photoelectric devices disposed at various places in these devices, it may be sometimes required to change the optical paths at an angle of 90 degrees for example.

Up to the present, as a known optical path changer component for changing a direction of an optical fiber at an angle of 90 degrees toward a photoelectric device, in particular as a known optical connector, a mirror disposed in front of an end of the optical fiber and a mirror face locally formed at a proper point in the optical fiber have been generally available. A mirror inclined at an angle of 45 degrees away from an optical path reflects light traveling in a horizontal optical fiber toward a direction at an angle of 90 degrees away therefrom and thus the light is directed to a photoelectric device or tracks back its reverse route. Meanwhile, an optical connector herein may include an optical interface connector for linking an optical fiber with a photoelectric device, as well as a general optical connector for mutual link of optical fibers.

Japanese Patent Application Laid-open Serials 2000-292658, 2004-94070 and 2003-315578 disclose related arts.

DISCLOSURE OF INVENTION

However, in the aforementioned optical connector having the mirror built in, light spatially propagates and therefore diffuses at a space between an end face of the optical fiber, or the photoelectric device, and the mirror. This possibly results in crosstalk with adjacent optical paths.

Further, the optical connector of this type has a mirror space in a main body thereof, which has an inclined mirror face at one end and another face with optical fiber holes in line at another end. Optical fibers are secured to the optical fiber holes and thereby ends of the optical fibers are directed to the mirror. There is a problem that this configuration requires very difficult treatments on the mirror space and proximities of the end faces of the optical fibers.

Further, production of a mirror face locally formed at a proper point in an optical fiber requires polishing the very fine optical fiber and a subsequent protection treatment, thereby making it difficult to produce optical fibers.

The present invention is intended for solving the aforementioned problems and providing an optical path changer component and an optical device using the same, which does not lead to crosstalk among adjacent optical paths and any problem to make it difficult to treat the mirror space and proximities of the end faces of the optical fibers, and provides ease of production.

According to a first aspect of the present invention, an optical path changer component changes optical paths of an optical fiber from a first direction to a second direction perpendicular to the first direction. The optical path changer component is comprised of a main body; a wall face formed inside the main body and curved from the first direction to the second direction; a guiding slot extending along the wall face so configured as to guide the optical fiber; and the optical fiber secured along the guiding slot.

According to a second aspect of the present invention, an optical path changer component changes optical paths of an optical fiber from a first direction to a second direction perpendicular to the first direction. The optical path changer component is comprised of: a main body; one or more optical fiber holes configured to respectively mate with the optical fibers, the optical fiber holes being formed inside the main body and curved from the first direction to the second direction; and one or more optical fibers respectively insert in the optical fiber holes.

Preferably, the main body has a hollow portion formed inside the main body and an optical fiber insertion aperture opened to an exterior of the main body and communicating with the hollow portion and the hollow portion communicates with the guiding slot. Alternatively preferably, the main body has a hollow portion formed inside the main body and an optical fiber insertion aperture opened to an exterior of the main body and communicating with the hollow portion and the hollow portion communicates with the optical fiber holes.

More preferably, the main body has a window portion opened to an exterior of the main body and communicating with the hollow portion.

Further more preferably, the optical fiber holes are arranged in one or more rows.

Alternatively, an optical device is comprised of any of the optical path changer component.

Preferably, the optical fiber is an optical fiber with smaller bending loss than a standard optical fiber.

The present invention does not require formation of mirrors and then curve an optical fiber for itself to direct the optical fiber to a desired direction. For example, an end of the optical fiber can be directed to a VCSEL or such mounted on a substrate having the optical connector mounted thereon. Therefore, unlike an optical connector having a mirror built in, it does not lead to crosstalk among adjacent optical paths. Further, any problems, such as a problem that treatments on the mirror space and proximities of the end faces of the optical fibers are difficult, and a problem that machining of an optical fiber is difficult, will not occur, thereby facilitating production thereof.

BEST MODE FOR CARRYING OUT THE INVENTION

An optical connector as an optical path changer component in accordance with certain embodiments of the present invention will be described hereinafter with reference to the appended drawings.

First Embodiment

Figure 1:
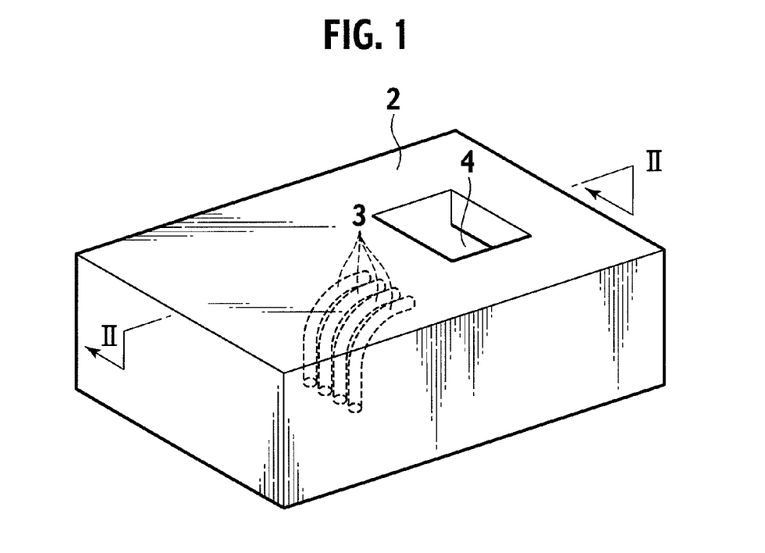
FIG. 1 is a perspective view of a connector main body of an optical connector in accordance with a first embodiment of the present invention.
Figure 2:
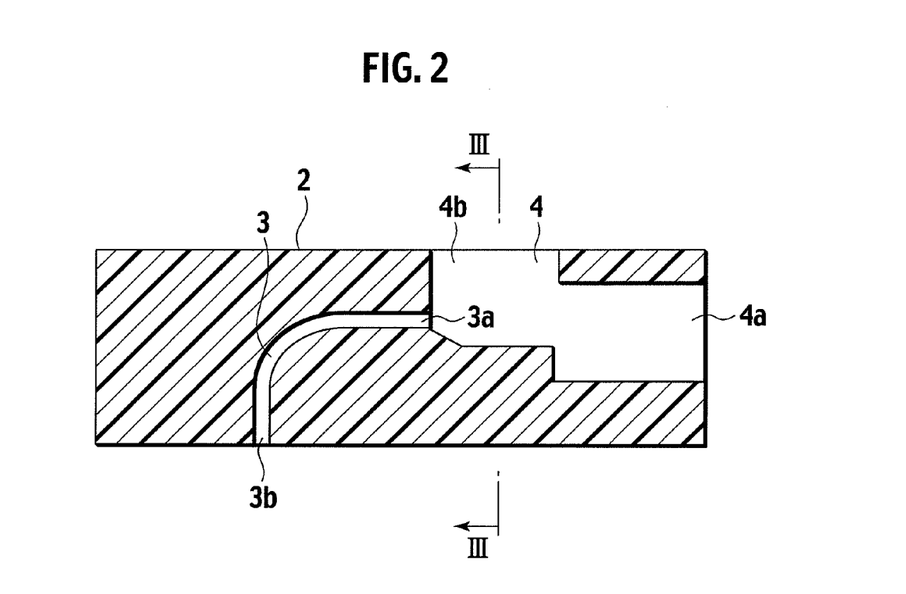
FIG. 2 is a cross sectional view taken from a line II-II of FIG. 1.
Figure 3:
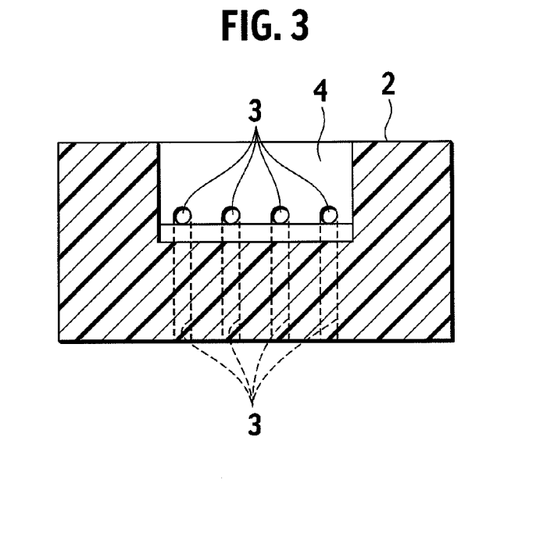
FIG. 3 is a cross sectional view taken from a line III-III of FIG. 2.

A first embodiment of the present invention will be described with reference to the drawings of FIG. 1 through FIG. 3. While these drawings illustrate an example of an optical fiber tape 7 including four cores, the number of cores may be arbitrary. Meanwhile, in the following description, sometimes the right direction in FIG. 2 may be referred to as "rearward", the left as "forward", the upper as "upper" or "upward", and the lower as "lower" or "downward".

A connector main body 2 is formed in a rectangular parallelepiped having a hollow portion 4 made of any synthetic resin such as epoxy or PPS for example, and is comprised of optical fiber holes 3 directed from a first direction (rearward of the connector main body) to a second direction (forward of the connector main body) and curving at the midway portion therebetween. The hollow portion 4 has an optical fiber tape entrance 4a opened rearward for insertion of an optical fiber tape 7 and an adhesive filling window 4b opened upward for being filled with adhesive. The optical fiber tape 7 is constituted of a plurality of optical fibers and the respective optical fibers are respectively inserted into the optical fiber holes 3. The optical fiber holes 3 horizontally to some extent extend from entrance portions 3a opened on a front wall face of the hollow portion 4 in the front direction and then curve downward at an angle of 90 degrees to communicate with exit portions 3b on the lower face. While the inner diameter of the optical fiber holes 3 is nearly equal to the outer diameter of the optical fibers, the entrance portions 3a are slightly greater and tapered toward the interiors. Thus the optical fibers 7a are guided by the entrance portions 3a and smoothly led to the interiors of the optical fiber holes 3. Meanwhile, the tapered entrance portions 3a may be made further greater in diameter and gradually shrink down to a diameter slightly greater than the diameter of the optical fibers.

Figure 4:
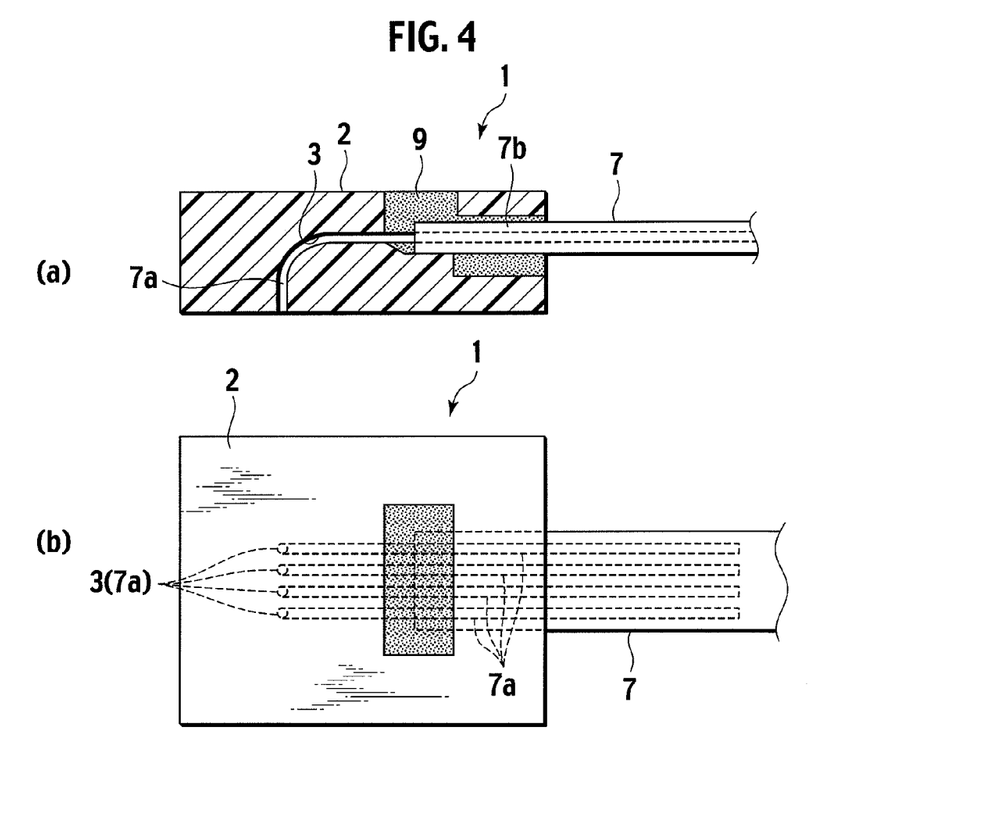
FIG. 4 shows a state in which the connector main body is attached to an end of an optical fiber tape to constitute an optical connector, in which (a) is a cross sectional view and (b) is a plan view.

The connector main body 2 is, as shown in FIGS. 4(a), (b), attached to the end of the optical fiber tape 7. More specifically, this attachment process includes, after removing a covering 7b at the end portion of the optical fiber tape 7 to expose the optical fibers 7a (preferably, bare fibers), inserting the optical fiber tape 7 through the optical fiber tape entrance 4a, inserting the exposed ends of the optical fibers 7a respectively into the entrance portions 3a, and further pressing them inward, thereby the optical fibers 7a slide along the optical fiber holes 3 and then curve downward to change these directions at an angle of 90 degrees and reach the exit portions 3b on the lower face. Subsequently adhesive 9 is filled therein through the adhesive filling window 4b so as to fix the optical fibers 7a and the covering 7b of the optical fiber tape 7 with the connector main body.

Figure 5:
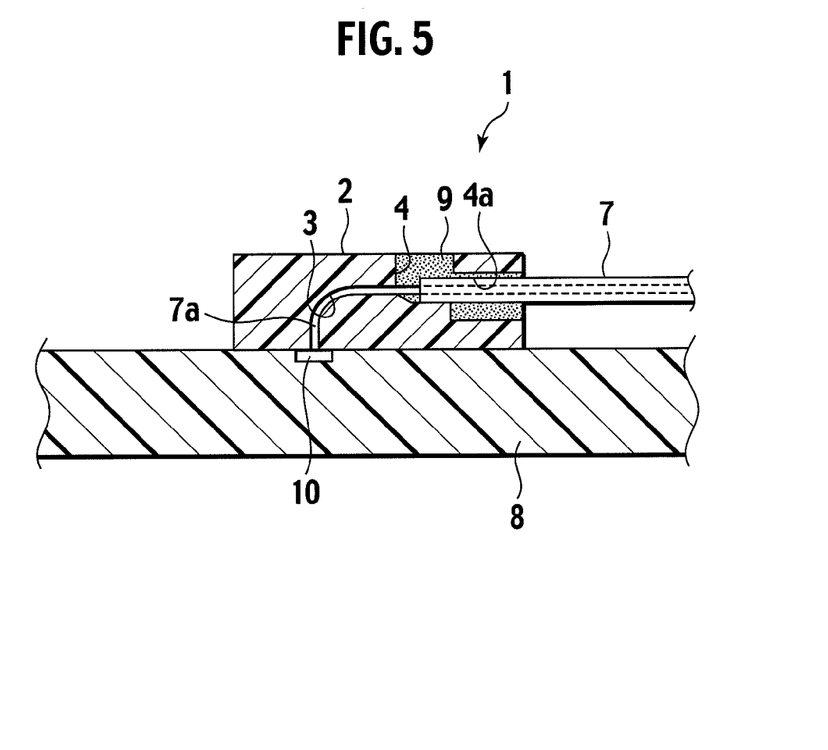
FIG. 5 is a cross sectional view showing a concrete example in which the optical connector of FIG. 4 is attached to a circuit board.
Figure 6:
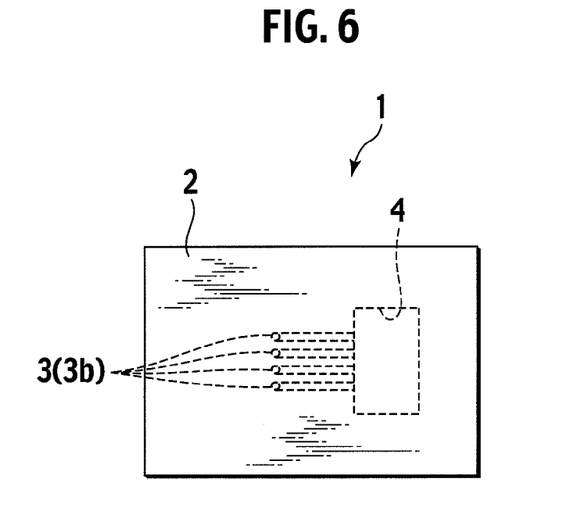
FIG. 6 is bottom view of a connector main body in accordance with a second embodiment.

In accordance with the aforementioned way, the optical connector 1 assembled at the end of the optical fiber tape 7 is positioned in place precisely relative to the circuit board 8 as shown in FIG. 5 by means of the proper positioning means.

On the circuit board 8, a photoelectric device array 10 having four photoelectric devices built in is mounted. Ends of two among the four cores of the optical fibers 7a are to be incident ends and the other two are to be output ends. The respective incident and output ends are precisely opposed to the respective photoelectric devices of the photoelectric device array 10. Here the photoelectric devices include two light emitting devices such as LEDs (Light Emitting Diodes) or VCSELs, and two light receiving devices such as PDs (Photo Diodes). The photoelectric device array 10 is that in which photoelectric devices are arranged to form an array.

As the aforementioned optical connector 1 does not use a mirror and the optical fibers 7a in itself curve to approach the photoelectric devices of the photoelectric device array 10, the optical connector 1 has substantially no possibility of having crosstalk among adjacent optical paths unlike an optical connector including a mirror for spatial propagation of light.

Further, existing problems such as difficulty of a treatment on end faces of optical fibers exposed to a mirror space would not arise and therefore production thereof is easy. More specifically, as inserting the optical fiber tape 7 and pressing the optical fibers 7a into the optical fiber holes 3, incident and output ends of the optical fibers 7a are led by the guide and thereby positioned in place to be opposed to the photoelectric device, thereby rendering any special treatments unnecessary.

In the present invention, if necessity of extremely bending (curving) optical fibers arises, any optical fibers resistive to bending are preferable to any standard fibers. More specifically, the optical fibers preferably have properties of small loss caused by bending and resistance to disconnection in optical fibers caused by bending stress induced by bending. Plastic optical fibers (POF), which are made of resins and therefore so flexible as to resist bending, or holey fibers having a structure, in which plural holes are cyclically placed around a core in a clad of a quartz optical fiber thereby having a property of resistance to bending, are considered preferable as the optical fibers of the present invention. Even in this case, the bending radius is kept in a range which provides tolerable loss caused by bending. More specifically, as the optical fibers applied to the invention, any optical fibers having smaller bending loss than standard optical fibers and suffering light deterioration even if the optical fibers are left curved can be applied. What is a standard optical fiber is, for example, a quartz optical fiber generally available in optical fiber communication of transmission wavelengths of 1310 nm-1630 nm and having a practical minimum bending radius of 30 nm.

By using such optical fibers having small bending loss, a compact optical path changer device having a small bending radius can be realized.

Further, core-assisted optical fibers or photonic crystal fibers may be applicable. A core-assisted optical fiber is a structure in which holes are formed around a core to confine light therein. A photonic crystal fiber is an optical fiber in which the number of holes of the core-assisted optical fiber is further increased so that the systematically arranged holes like as a crystal lattice form a photonic band gap and contrivance on dimensions of the holes, the number, intervals and arrangement dramatically reduces bending loss.

As the optical fiber having smaller bending loss, any quartz optical fibers having smaller core sizes than standard single-mode optical fibers, represented by "Future Guide", SR15 (a trademark and a model number of Fujikura LTD.) for example, may be applicable. This optical fiber has a transmission wavelength of 1.55 μm and a bending loss of 0.5 dB or smaller when it is wound 10 times in a diameter of 10 mm. However, optical fibers having further smaller bending loss, which is reduced by changing refractive-index distribution on a cross section of an optical fiber, are applicable.

As examples of optical fibers with changed refractive-index distribution, ones, refractive index profiles of which are made to be in a w-type or a trench type, can be exemplified.

Further, a PCF (plastic clad optical fibers) which is covered with plastic as a clad around a quartz is applicable.

Second Embodiment

Figure 7:
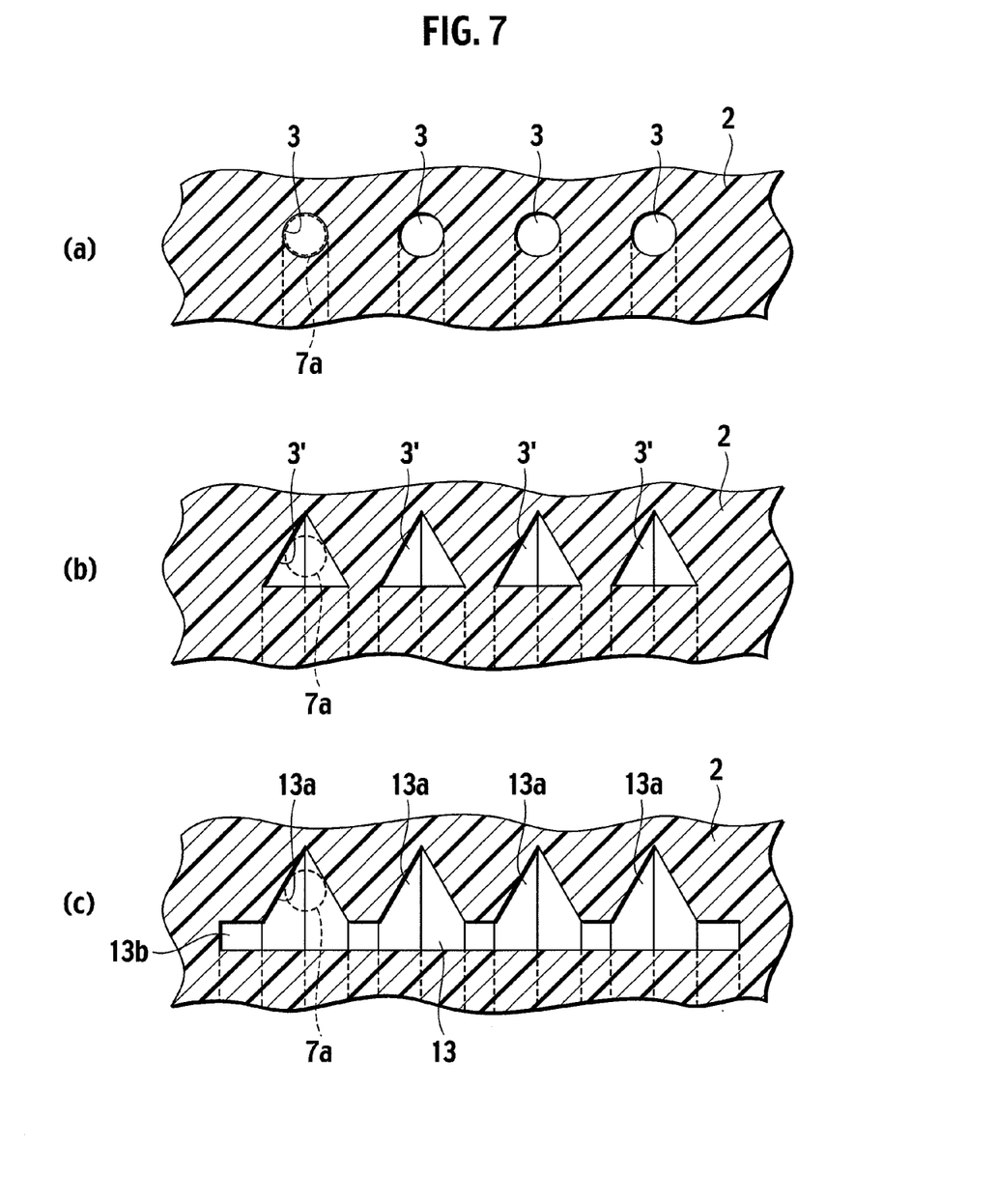
FIG. 7 is a drawing illustrating shapes of optical fiber holes in the optical fiber connector in accordance with a modification, in which (a) is an enlarged view of the optical fiber holes in accordance with the first embodiment, (b) shows a first modification, and (c) shows a second modification.

While in the aforementioned embodiment the optical fiber holes 3 within the connector main body 2 are, as shown in FIG. 7(a) in an enlarged view, made to be circular holes, optical fiber holes 3' having triangular cross sections as shown in FIG. 7(b) may be applicable. In this case, the optical fibers 7a are guided by faces on both sides of the vertexes of the triangular cross sections, thereby curving along the optical fiber holes 3' to reach the exit portions thereof.

Alternatively, the connector main body 2 may have, instead of independent optical fiber holes, only a single curving hole 13 in which four guiding slot 13a communicate with each other via a common space portion 13b as shown in FIG. 7(c).

Third Embodiment

Figure 8:
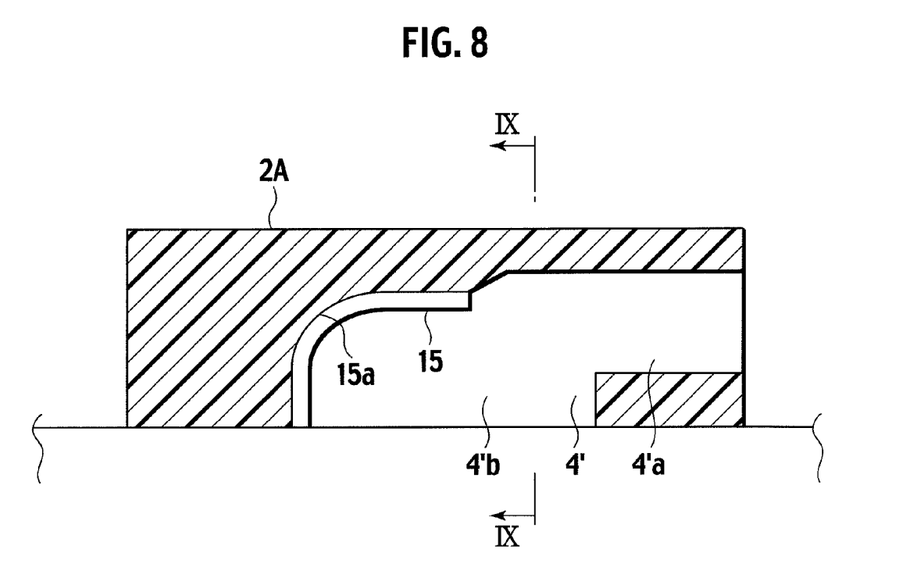
FIG. 8 is a cross sectional view of a connector main body of an optical connector in accordance with a third embodiment of the present invention.
Figure 9:
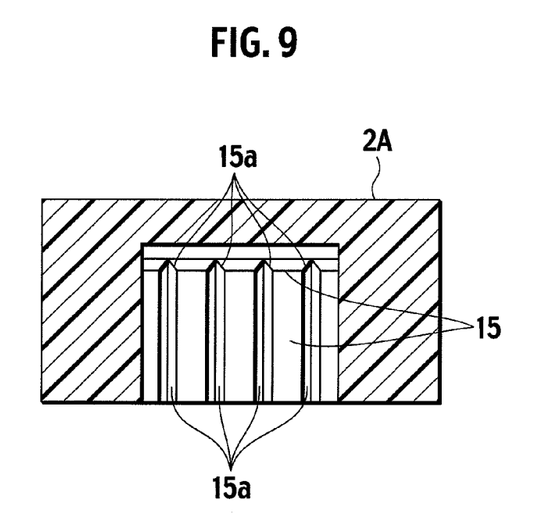
FIG. 9 is a cross sectional view taken along a line IX-IX of FIG. 8.
Figure 10:
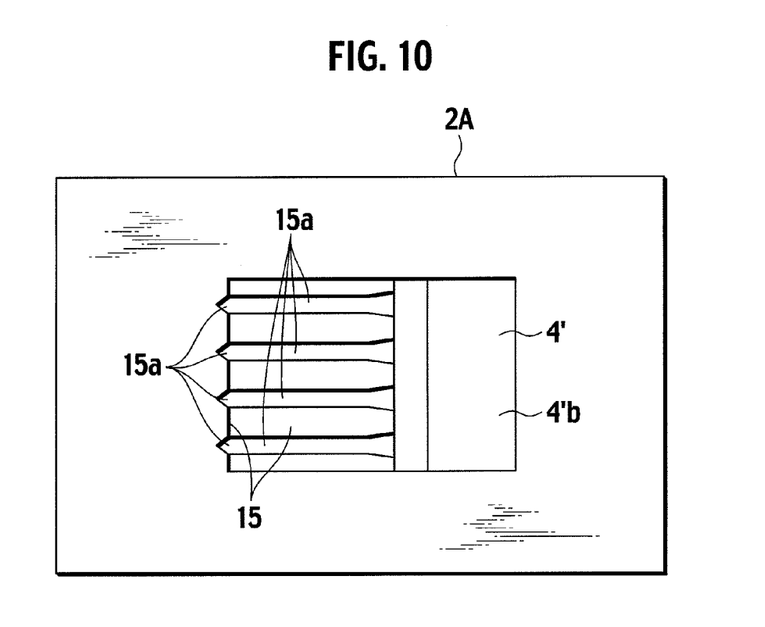
FIG. 10 is a bottom view of the connector main body.

Further, in a connector main body 2A as shown in FIGS. 8-10, a wall face in front of a hollow portion 4' may be made curved to be a wall face 15 and the connector main body 2A may have guiding slots 15a having V-shaped cross sections along the curved wall face 15. Formation of exposed slots having V-shaped cross sections is readily achieved on the basis of general knowledge of a skilled person.

In this case, as inserting the optical fiber tape 7 through the optical fiber tape entrance 4a', housing the exposed optical fibers 7a in the respective guiding slots 15a on the curved wall face 15 and pressing them forward, the ends of the optical fibers 7a are made curved along the guiding slots 15a to reach positions opposed to the respective photoelectric devices. Then the optical fibers 7a are secured along the guiding slots 15a.

Subsequently adhesive is filled in the hollow portion 4' so as to fix the optical fibers 7a and the covering 7b of the optical fiber tape 7.

Fourth Embodiment

Figure 11:
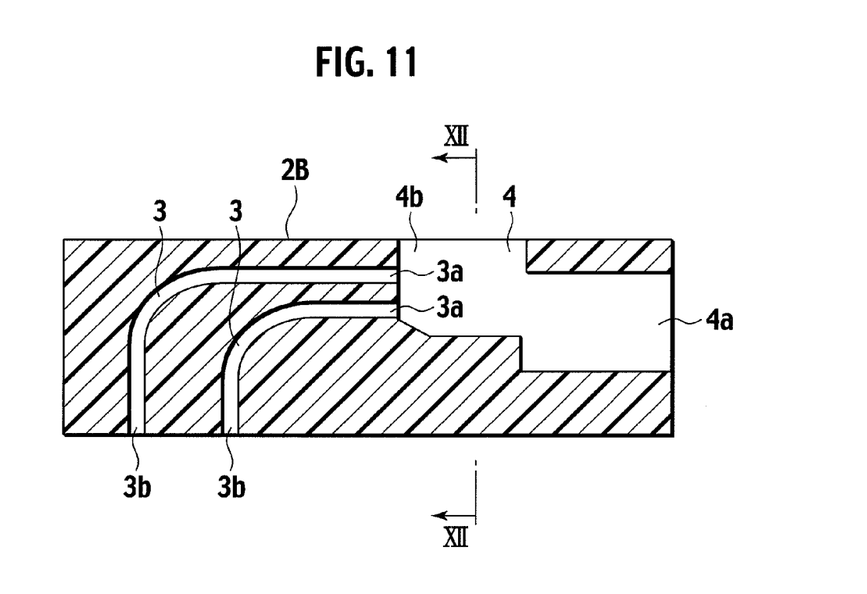
FIG. 11 is a cross sectional view of a main body of an optical connector in accordance with a fourth embodiment of the present invention.
Figure 12:
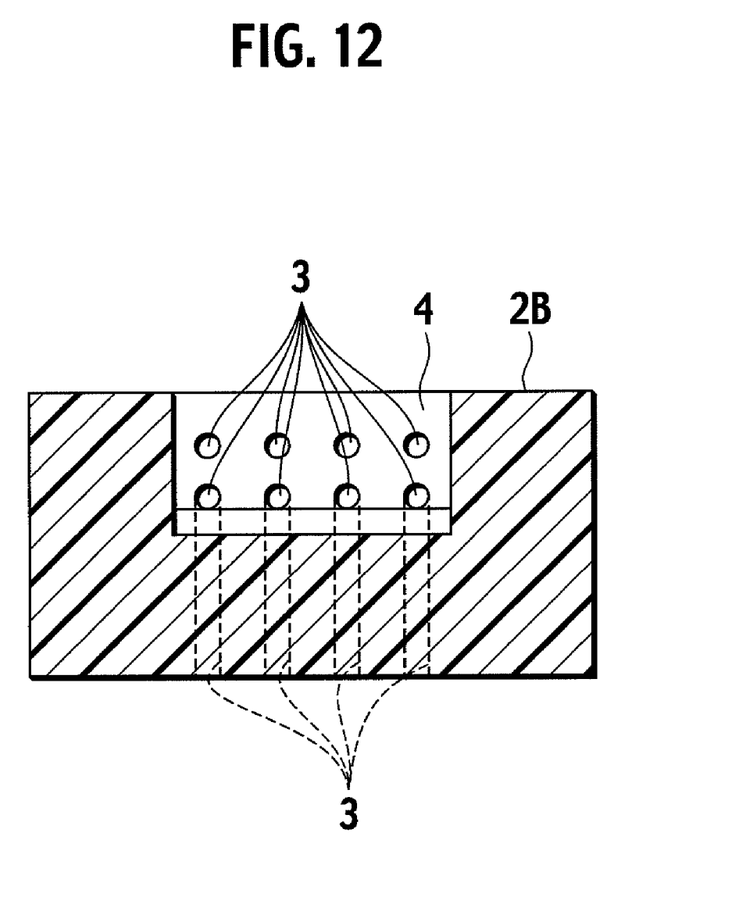
FIG. 12 is a cross sectional view taken along a line XII-XII of FIG. 11.

While the connector main body 2 of the aforementioned optical connector 1 is an optical connector of a one-dimensional arrangement in which the optical fibers 7a are arranged in a row (in FIG. 2, perpendicular to the surface of the sheet), it may be modified into an optical connector in which two rows of optical fiber holes 3 are formed like as a connector main body 2B as shown in FIGS. 11 and 12 and the ends of the optical fibers are arranged in a two-dimensional arrangement. In this case, as dividing the optical fibers of the optical fiber tape into two groups, distributing the optical fibers of the respective groups to the upper and lower rows of the optical fiber holes 3, and respectively pressing them into the two rows of the optical fiber holes 3, the optical fibers are made curved along the optical fiber holes 3 to approach the exit portions 3b so as to be opposed to the photoelectric devices arranged in a two-dimensional arrangement at the side of the circuit board.

Further, if the optical fiber tape in itself has a two-dimensional arrangement in which the optical fibers are arranged in two rows, the optical fibers arranged in the two-dimensional arrangement can be, without any additional process, made matched with the optical fiber holes arranged in the two-dimensional arrangement.

Meanwhile, it may be modified into a structure in which the optical fiber holes 3a of the upper row and the optical fiber holes 3b of the lower row are respectively made into each one (more specifically, two single-core optical fibers are vertically arranged therein).

Fifth Embodiment

Embodiments for mounting the optical connector of the present invention on the circuit board are not limited to what are shown in the drawings, but may be modified in various ways as necessary. For example, the optical connector may be directed to have the exit portions of the optical fiber holes faced upward (upside down as compared with the case shown in FIG. 5). An auxiliary circuit board on which photoelectric devices are mounted is connected therewith to be opposed to the exit portions. The optical connector is connected with the main circuit board (corresponding to the circuit board 8) via the auxiliary circuit board.

The aforementioned description is targeted an optical connector for interfacing with input and output of optical devices on a board, as the component having a function of changing optical paths. However, a component merely having a function of changing optical paths without a function of optical connection also falls within the scope of the invention. Further, various optical equipments, such as optical communication equipments, electro-optics combination circuits, optical signal processors and optical circuits, also fall within the scope of the present invention. Moreover, in the aforementioned embodiments, the first and the second directions are stated to be perpendicular, however, ways of intersection are not limited to the perpendicular and therefore the present invention can be applied to any case in which intersection is not the perpendicular.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

An optical path changer component, or an optical connector, and an optical device using the same, which do not use a mirror and provide ease of production, are provided.

The invention claimed is:

1. An optical path changer component for changing optical paths of an optical fiber from a first direction to a second direction perpendicular to the first direction, the optical path changer component comprising:
 a main body for being mounted on a circuit board, the main body having a coupling surface facing the circuit board;
 a hollow portion formed in the main body, the hollow portion having an insertion aperture in which a plurality of optical fibers is collectively inserted from a sideways direction, and an adhesive filling window opening on the coupling surface and communicating with a forward side of the insertion aperture;

a curved wall face formed in the hollow portion, the curved wall face being curved from a forward portion of the insertion aperture toward a photoelectric device on the circuit board disposed at a side of the adhesive filling window so as to reach an edge of the adhesive filling window, the adhesive filling window being dimensioned so as to allow an overall view of the curved wall face;

a plurality of guiding slots extending along the wall face toward the photoelectric device formed according to the optical fibers from the forward portion of the insertion aperture to the end edge of the adhesive filling window;

the optical fibers respectively housed in the corresponding guiding slots and made curved along the guiding slots so as to be opposed to the photoelectric device at the end edge of the adhesive filling window; and an adhesive filled through the adhesive filling window in the hollow portion to fix the plurality of the optical fibers disposed from the insertion aperture to the end edge of the adhesive filling window with the main body.

2. An optical path changer component for changing optical paths of optical fibers from a first direction to a second direction perpendicular to the first direction, the optical path changer component comprising:

a main body for being mounted on a circuit board, the main body having a coupling surface facing the circuit board;

a hollow portion formed in the main body, the hollow portion having an insertion aperture in which an optical fiber tape integrally supporting a plurality of optical fibers is inserted from a sideways direction, and an adhesive filling window opening on the coupling surface and communicating with a forward side of the insertion aperture;

a curved wall face formed in the hollow portion, the curved wall face being curved from a forward portion of the insertion aperture toward a photoelectric device on the circuit board disposed at a side of the adhesive filling window so as to reach an end edge of the adhesive filling window, the adhesive filing window being dimensioned so as to allow an overall view of the curved wall face;

a plurality of guiding slots extending along the wall face toward the photoelectric device formed according to the optical fibers from the forward portion of the insertion aperture to the end edge of the adhesive filling window;

the optical fibers exposed out of the optical fiber tape by removing a covering at its end portion respectively housed in the corresponding guiding slots and made curved along the guiding slots so as to be opposed to the photoelectric device at the end edge of the adhesive filling window; and an adhesive filled through the adhesive filling window in the hollow portion to fix the optical fiber tape and the plurality of the optical fibers disposed from the insertion aperture to the end edge of the adhesive filling window with the main body.

3. The optical path changer component as recited in claim 1, wherein the main body has a hollow portion formed inside the main body and an optical fiber insertion aperture opened to an exterior of the main body and communicating with the hollow portion and the hollow portion communicates with the guiding slot.

4. The optical path changer component as recited in claim 2, wherein the main body has a hollow portion formed inside the main body and an optical fiber insertion aperture opened to an exterior of the main body and communicating with the hollow portion and the hollow portion communicates with the optical fiber holes.

5. The optical path changer component as recited in claim 3 or 4, wherein the main body has a window portion opened to an exterior of the main body and communicating with the hollow portion.

6. The optical path changer component as recited in claim 2, wherein the optical fiber holes are arranged in one or more rows.

7. An optical device comprising the optical path changer component as recited in claim 1 or 2.

8. The optical path changer component as recited in claim 1 or 2, characterized in that the optical fiber is an optical fiber with smaller bending loss than a standard optical fiber.

9. The optical path changer component as recited in claim 4, wherein the main body has a window portion opened to an exterior of the main body and communicating with the hollow portion.

10. An optical device comprising the optical path changer component as recited in claim 2.

11. The optical path changer component as recited in claim 2, characterized in that the optical fiber is an optical fiber with smaller bending loss than a standard optical fiber.

* * * * *